(12) United States Patent
Nakamura

(10) Patent No.: US 7,339,753 B2
(45) Date of Patent: Mar. 4, 2008

(54) LIGHT SCANNING APPARATUS AND IMAGING APPARATUS

(75) Inventor: Akira Nakamura, Tokyo (JP)

(73) Assignee: Sony Corporation, Tokyo (JP)

( * ) Notice: Subject to any disclaimer, the term of this patent is extended or adjusted under 35 U.S.C. 154(b) by 237 days.

(21) Appl. No.: 11/208,349

(22) Filed: Aug. 18, 2005

(65) Prior Publication Data
US 2006/0291046 A1 Dec. 28, 2006

(30) Foreign Application Priority Data
Sep. 3, 2004 (JP) ............................ P2004-257063

(51) Int. Cl.
G02B 17/00 (2006.01)
(52) U.S. Cl. .................... 359/726; 359/727; 355/53
(58) Field of Classification Search ................ 359/726, 359/727, 728, 364, 663; 355/53; 386/127
See application file for complete search history.

(56) References Cited

U.S. PATENT DOCUMENTS 7,116,455 B2 * 10/2006 Yamaoka .................... 359/212

2002/0164157 A1 * 11/2002 Hori et al. .................. 386/127
2004/0145792 A1 * 7/2004 Maeyama et al. .......... 359/239

* cited by examiner

Primary Examiner—Tim Thompson
(74) Attorney, Agent, or Firm—Sonnenschein Nath & Rosenthal LLP

(57) ABSTRACT

In a light scanning apparatus including an optical system including a beam deflection means therein and a one-dimensional light modulation device, the one-dimensional light modulation device is disposed on the object side of the optical system, and the beam deflection means is disposed at a diaphragm position. In the optical system, a positive-power former group and a positive-power latter group are arranged, and a one-dimensional image obtained through light modulation by the one-dimensional light modulation device is scanned by the beam deflection means, to thereby form a two-dimensional image on an image plane of the optical system. In application to a projector apparatus or the like, the two-dimensional image can be enlargedly projected by a projecting optical system.

29 Claims, 12 Drawing Sheets

LIGHT SCANNING APPARATUS AND IMAGING APPARATUS

RELATED APPLICATION DATA

The present application claims priority to Japanese Application(s) No(s). P2004-257063 filed Sep. 3, 2004, which application(s) is/are incorporated herein by reference to the extent permitted by law.

BACKGROUND OF THE INVENTION

The present invention relates to a technology for contriving an enhancement of the performance of an optical system including beam deflection means, in a light scanning apparatus and an imaging apparatus (e.g., projector apparatus) for forming a two-dimensional image by use of a light modulation device having pixels arrayed in a one-dimensional form.

There have been known projector apparatuses for enlargingly projecting a two-dimensional image by use of a two-dimensional display device such as liquid crystal device, and, attendant on the introduction of a new broadcasting system, enhancement of image processing speed owing to the progress of computing devices, conversion from analog cinema to digital cinema and the like in recent years, there has been an increasing request for higher resolutions.

However, it is difficult for two-dimensional display devices to follow up to the enhancement of resolution. Specifically, in increasing the number of pixels, when it is contrived to obtain a higher resolution while fixing the size of the display device, it may be inevitable to reduce the openings in the display part, and it becomes difficult to realize a bright projector apparatus. On the other hand, when it is contrived to obtain a higher resolution while fixing the pixel size, it may be inevitable to increase the size of the display device, leading to an enlargement of the apparatus including an optical system and to a raised cost. Besides, in the manufacturing process of a two-dimensional display device, reduction of the pixels may need a countermeasure against mixing-in of smaller foreign matter; on the other hand, enlargement of the display device may need an enlargement of the production equipment.

There is known a system in which a light modulation device of a one-dimensional space modulation type is irradiated with a filamentous beam, and a one-dimensional image obtained by the light modulation device is projected onto a screen while scanning it along a direction orthogonal to the one-dimension direction by a light scanning means such as a galvanometer, thereby forming a two-dimensional image. Incidentally, in the one-dimensional space modulation type light modulation device, for example, a grating light valve (hereinafter referred to as "GLV") developed by Silicon Light Machine (SLM) of USA, a plurality of movable ribbons are arrayed at a predetermined interval, and fixed ribbons are disposed between the adjacent movable ribbons. The movable ribbons are moved by impressing a drive voltage between a common electrode and the movable ribbons, to constitute a diffracting grating for the incident light.

For example, comparing a two-dimensional display device and a one-dimensional display device such as a GLV device while taking a high definition television (so-called HDTV) as an example, the two-dimensional display device may need 1920×1080, or about 2070 thousand pixels, whereas a system of scanning a one-dimensional image in a horizontal direction may need only 1080 devices; thus, there is a clear difference between both types of devices.

A GLV device is composed of a phase reflection type diffraction grating formed by the MEMS (MicroElectro Mechanical System) technology, and, where the GLV device is used with an illumination optical system for irradiating the device, the diffraction grating constituting each pixel is driven by a picture signal, and a phase difference generated thereby is controlled, whereby the function as an image display device is displayed. As a spatial filter for separating the ±1 order diffracted beams and the 0 order diffracted beam coming from each pixel from each other and shielding a specified light component (OFF light), the so-called schlieren optical system is adopted.

In relation to a projector optical system applied to a large-type display apparatus using one-dimensional display devices, there has been proposed, for example, a system in which a one-dimensional intermediate image is enlargedly projected by a projecting lens, and light scanning is conducted by use of a light deflector arranged at or around the pupil position of the projecting lens, to obtain a two-dimensional projected image on a screen (see, for example, Japanese Patent Application No. 2000-513114).

In addition, in application to a rear projector or the like, there may be mentioned a configuration in which a projecting lens system composed of a former group and a latter group is provided for shortening the projection distance, and a scan mirror is arranged in the air gap between the former group and the latter group (see, for example, Japanese Patent Laid-open No. 2002-131838).

SUMMARY OF THE INVENTION

Meanwhile, in the configurations in the past, there have been the problem that it may be impossible to obtain optical performance necessary for raising resolution or that increases in apparatus size or cost may be inevitable to obtain a sufficient optical performance.

For example, in a configuration in which a two-dimensional image is formed by light scanning after enlargingly projecting a one-dimensional intermediate image, the pupil position of a projecting lens is located at a position spaced from the lens, so that the size of the projecting lens itself may necessarily be enlarged. In addition, where a zooming function is added to the projecting lens system, it may be necessary to change the scan angle each time of zooming, possibly leading to complication of the system. Besides, where it is attempted to regulate the position of a projected image on a screen by shifting the optical axis of the projecting lens relative to the one-dimensional intermediate image, a conspicuous image distortion may result.

In the case of a system having a short projection distance such as a rear projector, focus deviation or image distortion or the like on the screen may be generated, causing deterioration of image. Or, where enlarging projection by a projecting lens system is conducted immediately after scanning of a one-dimensional image by a beam deflector, it is difficult to obtain a satisfactory optical performance inclusive of reduction of aberration and the like, leading to troubles in achieving size reduction, cost reduction or the like.

In an optical system using a beam deflector such as a galvano scanner, there is a difference in the operation influencing the optical image forming action between the major axis direction of the one-dimensional display device and the direction of scanning by the beam deflector, so that a sufficient consideration on the basis of optical design may be needed in relation to the image forming performance inclusive of distortion and the like.

Accordingly, there is a need for generation of a two-dimensional image by scanning of a one-dimensional image, in a system configuration using a one-dimensional light modulation device and a beam deflection means, and for achievement of reductions in size and cost.

According to an embodiment of the present invention, there is provided a configuration including an optical system including a beam deflection means therein, and a one-dimensional light modulation device. The one-dimensional light modulation device is disposed on the object side of the optical system, the beam deflection means is disposed at a diaphragm position, and a two-dimensional image is formed on an image plane of the optical system by scanning a one-dimensional image by use of the beam deflection means.

Therefore, according to the embodiment of the present invention, it is unnecessary to dispose the beam deflection means at the pupil position of a projecting optical system, and the two-dimensional image can be obtained by scanning the one-dimensional image by use of the beam deflection means disposed at the diaphragm position (for example, the two-dimensional image can be enlargedly projected by a projecting optical system on the latter stage).

The embodiment of the present invention is advantageous for reductions in size and cost of the optical system including the beam deflection means, and is effective for enhancing the performance of the optical system for forming the two-dimensional image by scanning the one-dimensional image.

In addition, in relation to a cylindrical image plane curvature attendant on the beam deflection (scanning), correction can be conducted by use of a rotation-symmetric surface about the optical axis, without using a cylindrical surface such as a cylindrical lens.

It is preferable on an optical design basis that the optical system includes a positive-power former group and a positive-power latter group which are disposed on opposite sides of the beam deflection means, the former group being disposed on the one-dimensional light modulation device side of the beam deflection means, and the latter group being disposed on the two-dimensional image side of the beam deflection means, and an arrangement in which, with respect to the former group and the latter group, the optical system is telecentric (satisfying substantially perpendicular incident/outgoing conditions) on the one-dimensional light modulation device side and on the two-dimensional image side is effective for preventing the amount of peripheral light from being lowered or for other purposes.

Of the optical system, each of optical devices exclusive of the component devices of the beam deflection means has a rotation-symmetric surface about the optical axis, and, when this configuration is adopted, the need for a cylindrical surface is eliminated (Image plane curvature can be corrected by an axisymmetric spherical system, which is advantageous for ease of lens production, reduction in cost, or the like).

In the optical system using the beam deflection means such as a galvanometer, it is necessary to pursue an imaging performance inclusive of distortion while taking into sufficient account the difference on an optical design basis between the major axis direction of the one-dimensional light modulation device and the direction of scanning the one-dimensional image by the beam deflection means. As for the non-axial characteristics represented by the distortion, particularly where the angle of scanning by the beam deflection means is set large, adoption of a configuration in which both the diffraction surfaces on opposite sides of the beam deflection means are concave surfaces is advantageous for enhancement of performance, like the case of an ordinary wide angle lens system.

In the configuration where the former group and the latter group are structurally symmetric with each other with respect to the beam deflection means and constitute an equal-size imaging system (a symmetric structure of the former group and the latter group based on an equal-size imaging optical system), in consideration of productivity and the like, there is the merit that the lens devices of the same constitution can be used as the former group and the latter group (this point can be said to be a design element which should be positively made the most of).

It is preferable that the former group and the latter group are each composed of seven lenses, that when the lenses arrayed in the direction from the one-dimensional light modulation device side or the two-dimensional image side toward the light modulation means are sequentially named the first to seventh lenses, the first to seventh lenses sequentially have positive, negative, negative, positive, positive, positive and negative powers and the relationship of "$0.3 \cdot f \leq d \leq 0.5 \cdot f$" is established, where "d" is the interval between the second lens and the third lens, and "f" is the focal distance of the whole group, and that the second lens and the third lens are arranged with their concave surfaces opposed to each other.

This has intimate relationship with the non-axial characteristics, particularly the characteristic of image plane curvature, and is effective for pursuing enhancement of optical performance. In addition, the configuration in which the second lens is a negative meniscus lens also has intimate relationship with non-axial characteristics, particularly the characteristic of image plane curvature.

For reducing the chromatic aberration, it is desirable to use a material such as a low dispersion glass having an Abbe number (vd) of not less than 80 is used for a part of the lenses constituting the former group or the latter group, for example, the first lens and the fourth lens.

Further, the use of a material such as a high refractive index glass having a refractive index (nd) of not less than 1.7 is used for a part of the lenses constituting the former group or the latter group, for example, the fifth lens and the sixth lens, contributes on the reduction in the number of component lenses of the whole system.

A configuration in which an Offner optical system is disposed as a relay imaging system between the one-dimensional light modulation device and the optical system has the merits that a high contrast is obtained, that chromatic aberration is absent, that the back focus can be set long, and so on.

In addition, a configuration in which a projecting optical system for enlargingly projecting the two-dimensional image as an intermediate image is arranged promises easy enlargement and zooming and is advantageous for simplification of configuration.

According to the present invention, primary attention is paid to the configuration of a system itself for conversion of a one-dimensional image into a two-dimensional image, and a projecting optical system and the like are combined with this system, whereby it is made possible to treat the two-dimensional image as if it were a two-dimensional display device, and to add various projecting lenses according to the use. Besides, when a system with the same specifications as those in the related art is assumed, the optical system can be constituted by use of smaller lens devices, and, even in consideration of the increase in the number of component lenses, it is possible to provide an optical system having a lower cost and a higher productivity.

Incidentally, in the one-dimensional light modulation device utilizing a diffracting action, it is necessary to select a diffracted light component of a specified order, and a schlieren diaphragm is added to or arranged for the reflecting mirror constituting the beam deflection means.

The present invention contributes to enhancement of optical performance and image quality and the like, in application to an imaging apparatus such as projectors and printers.

DESCRIPTION OF THE PREFERRED EMBODIMENTS

The present invention is applicable to a front projection type or rear projection type imaging apparatus, or an image output apparatus such as a printer or the like, in which, for example, a one-dimensional image formed by a light modulation device of the one-dimensional space modulation type is scanned by beam deflection means such as a galvanometer to form a two-dimensional image, and the two-dimensional image is displayed by projection.

Figure 1:
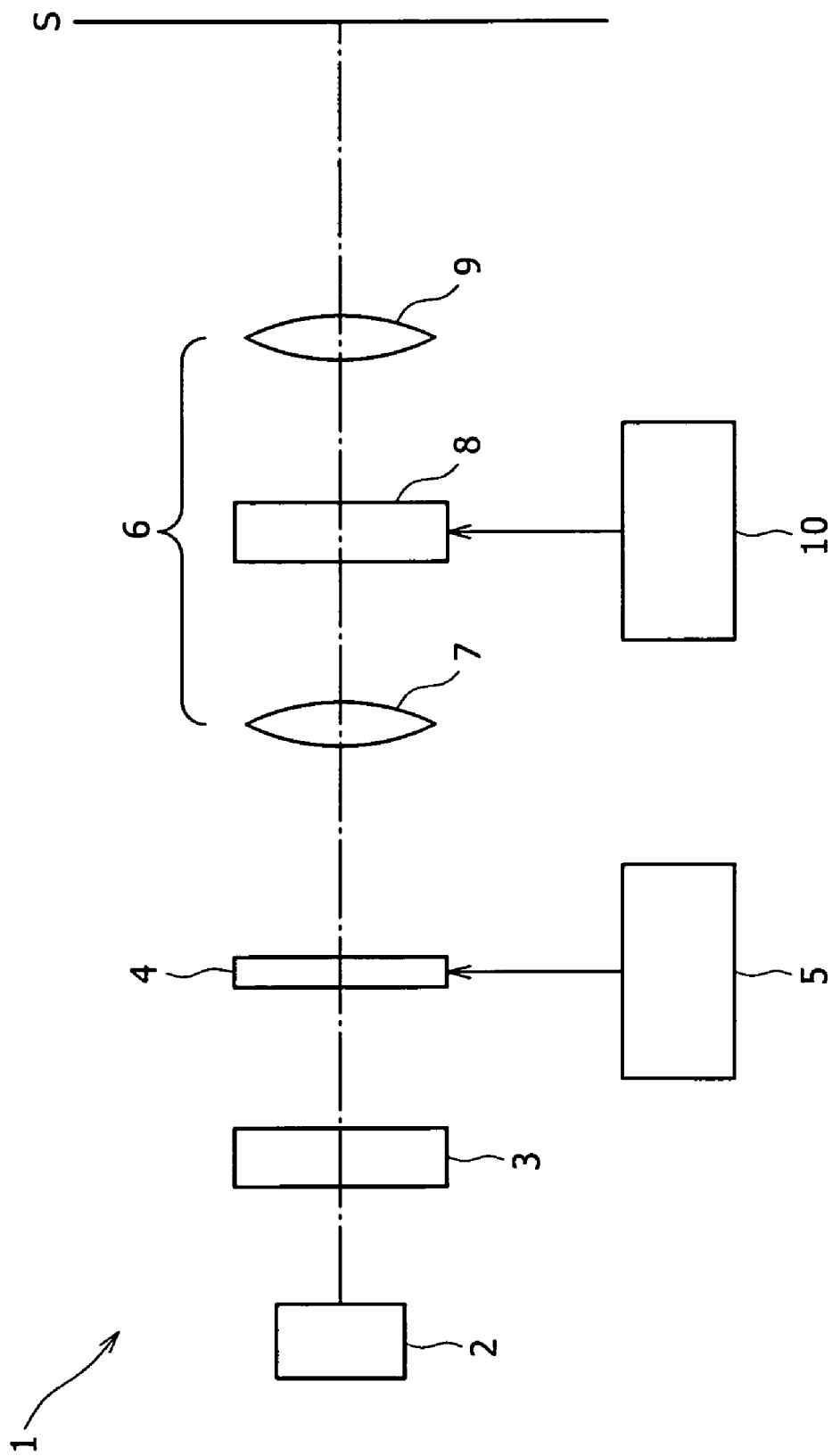
FIG. 1 illustrates a basis configuration of a light scanning apparatus according to an embodiment of the present invention.

FIG. 1 shows an exemplary basic configuration of a light scanning apparatus 1 according to an embodiment of the present invention, in which a light source 2, an illumination optical system 3, a one-dimensional light modulation device 4, and an optical system 6 are located on an optical axis indicated by dot-dash line.

As the light source 2, for example, a laser light source such as semiconductor laser and solid state laser is used.

The light emitted from the light source 2 is processed through the illumination optical system 3 to be a filamentous beam, with which the one-dimensional light modulation device 4 is irradiated. Incidentally, the illumination optical system 3 includes a lens system for beam reshaping, beam expansion or the like.

The one-dimensional light modulation device 4 has a plurality of component devices (the above-mentioned GLV devices, liquid crystal display devices, etc.) arrayed in a predetermined direction, and drive control is conducted by receiving a signal from drive means 5. While a transmission type device is shown for convenience of showing by figure in this example, the transmission type device is not limitative, and a reflection type device and the like can be used.

The drive means 5 includes a drive circuit for the one-dimensional light modulation device 4, generates a drive signal according to a command, and supplies the drive signal to the one-dimensional light modulation device 4 (Light modulation is conducted by drive control over the one-dimensional light modulation device 4 by the drive means 5).

The optical system 6 includes a former group 7, beam deflection means 8, and a latter group 9 (In the figure, the former group 7 and the latter group 9 are indicated in a simplified form as single lenses).

The beam modulated by the one-dimensional light modulation device 4 is transmitted through the former group 7, to reach the beam deflection means 8.

The beam deflection means 8 is provided for scanning the one-dimensional image, obtained by the light modulation, along a direction orthogonal to the array direction of the component devices of the one-dimensional light modulation device 4 (the direction of the major axis of the one-dimensional light modulation device), and operation control is conducted by receiving a control signal from light scan control means 10. For example, a galvanometer scanner is used, and the scan position is controlled by control of rotation of a galvano mirror.

The beam of which the proceeding direction is varied according to the scan position by the beam deflection means 8 is transmitted through the latter group 9, to outgo. In other words, with respect to the optical system 6, the one-dimensional light modulation device 4 is disposed on the object side thereof, the beam deflection means 8 is disposed at a diaphragm position, and the one-dimensional image sent from the one-dimensional light modulation device 4 is scanned by use of the beam deflection means 8 to thereby form a two-dimensional image on an image plane (see "S" in the figure).

The former group 7 and the latter group 9 disposed symmetrically on opposite sides of the beam deflection means 8 both have positive refractive powers (powers).

Incidentally, in application to a projector apparatus or the like, a configuration in which a projecting optical system is disposed on the latter stage of the optical system 6 may be mentioned. Specifically, a two-dimensional image formed through the optical system 6 is used as an intermediate image, and a projecting optical system for enlargingly projecting the image onto a screen may be arranged. In addition, to design a lens system having a negative power in addition to inclusion of a projecting lens in the latter group 9 may also be contemplated. In consideration of the problem of distortion aberration, enlargement of the size of an outgoing-side lens and the like, however, a configuration in which the latter group is set to have a positive power to thereby form a two-dimensional image on the image plane of the optical system 6 and thereafter the two-dimensional image is enlargedly projected is desirable on a practical use basis (the arrangement of lenses of the latter group and the projecting optical system can be designed individually). Besides, while an irradiated type configuration using the light source 2 and the illumination optical system 3 has been shown in FIG. 1, a configuration using a self-light-emitting type one-dimensional light modulation device can also be adopted.

Figure 2:
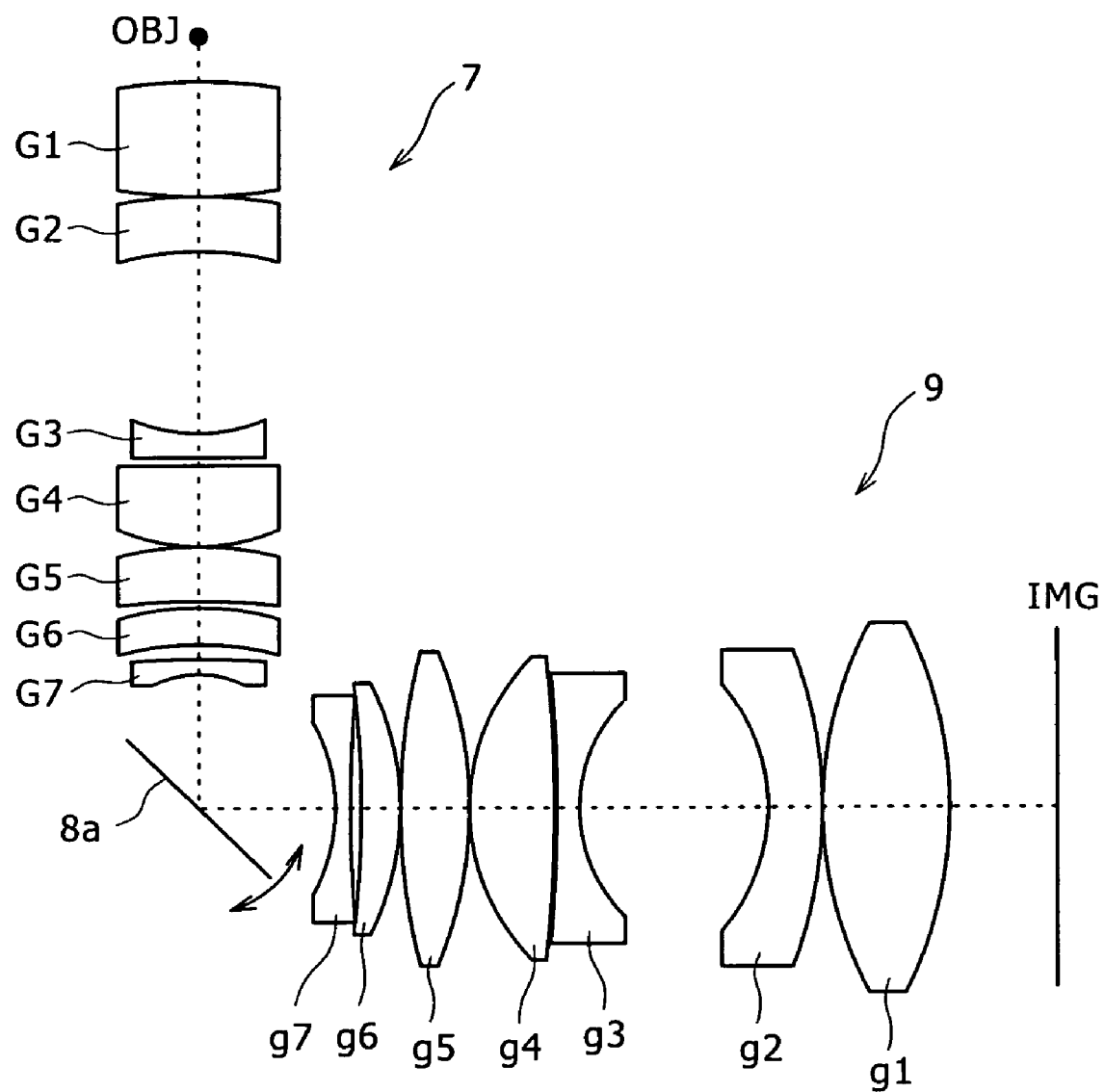
FIG. 2 illustrates an exemplary configuration of an optical system used in the embodiment of the present invention.

FIG. 2 shows an exemplary configuration of the optical system 6, in which the former group 7 and the latter group 9 are each composed of seven lenses.

In the figure "OBJ" denotes an object point (the intersection of a filamentous object and the paper surface), "IMG" denotes an image plane, and a reflecting mirror 8a as a component device of the beam deflection means 8 is disposed between the former group 7 and the latter group 9. Incidentally, the reflecting mirror 8a is a movable reflecting mirror (galvanometer), and is turned over a predetermined angular range with the reference being the posture of being inclined at an angle of 45° against each of optical axes of the former group 7 and the latter group 9.

The former group 7 and the latter group 9 are structurally symmetric with each other (in this example, equal-size imaging systems) with respect to the reflecting mirror 8a, and are telecentric on both the object side and the image side. The beam emitted from the OBJ and then transmitted through the former group 7 is reflected by the reflecting mirror 8a, and is then transmitted through the latter group 9 to form an image on the IMG.

The former group 7 is composed of lenses G1 to G7, the numbers 1 to 7 being added in the order from the closest to the OBJ. The latter group 9 is composed of lenses g1 to g7, the numbers 1 to 7 being added in the order from the closest to the IMG.

As for the refractive power of each of the lenses, G1 and g1 have positive power, G2 and g2 have negative power, G3 and g3 have negative power, G4 and g4 have positive power, G5 and g5 have positive power, G6 and g6 have positive power, and G7 and g7 have negative power.

The lens intervals between G2 and G3 and between g2 and g3 are comparatively long, the opposed surfaces of both the lenses are both concave surfaces, and G2 and g2 are negative meniscus lenses. Besides, G7 and g7 both have concave surfaces as surfaces opposed to the reflecting mirror 8a.

Figure 3:
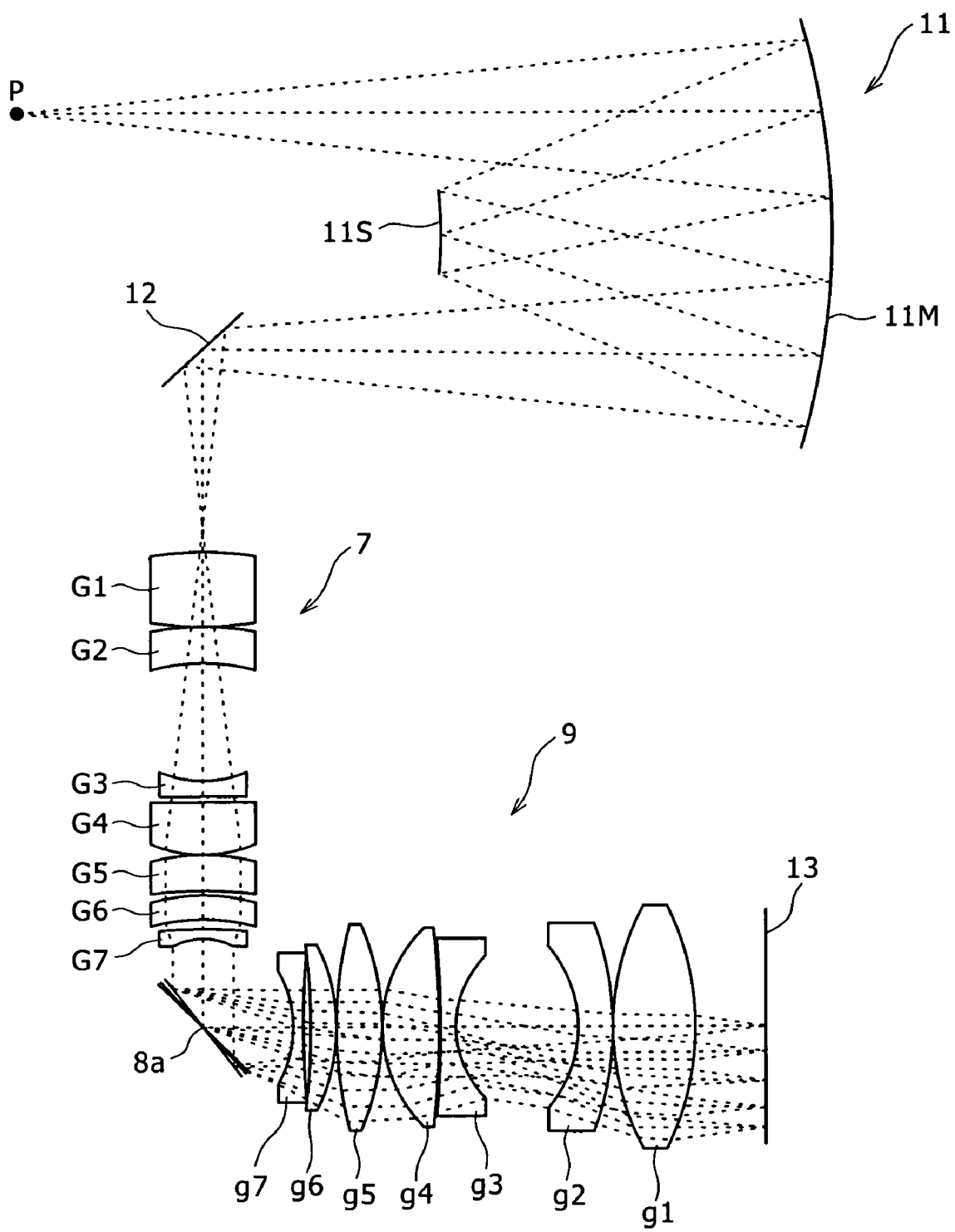
FIG. 3, together with FIG. 4, illustrates an exemplary configuration using an Offner optical system, and is an illustration of the sectional configuration.

FIG. 3 shows an exemplary configuration in which an Offner optical system is disposed as a relay imaging system at the former stage of the optical system 6.

The axis passing through point "P" shown in the figure and being orthogonal to the paper surface is the major axis direction of the one-dimensional light modulation device, the beam modulated by use of the device is reflected by a primary mirror 11M of the Offner optical system 11, and is then reflected further by a secondary mirror 11S. Thereafter, the beam is reflected by the primary mirror 11M for the second time, and this beam reaches the reflecting mirror 12, where the optical path of the beam is changed, before incidence on the former group 7.

The beam scanned by use of the reflecting mirror 8a is transmitted through the latter group 9, to form a two-dimensional image 13 (the figure shows by way of example the beams with respect to the scan position at five locations on one side).

Figure 4:
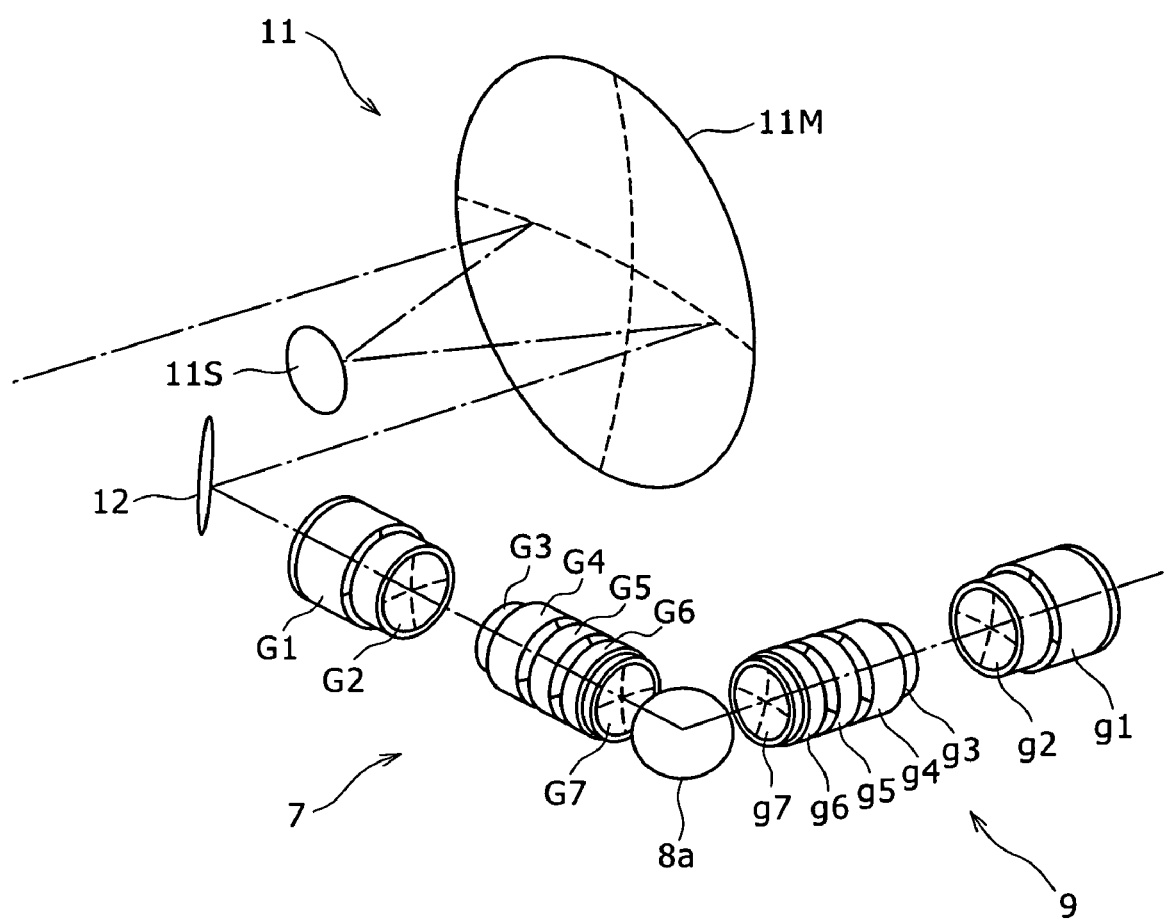
FIG. 4 is a general perspective view.

FIG. 4 shows a general perspective view, in which the lenses constituting the former group 7 and the latter group 9 have rotation-symmetric surfaces about the optical axis. Specifically, an axisymmetric spherical or non-spherical surface is used as each lens surface.

EXAMPLE 1

Figure 5:
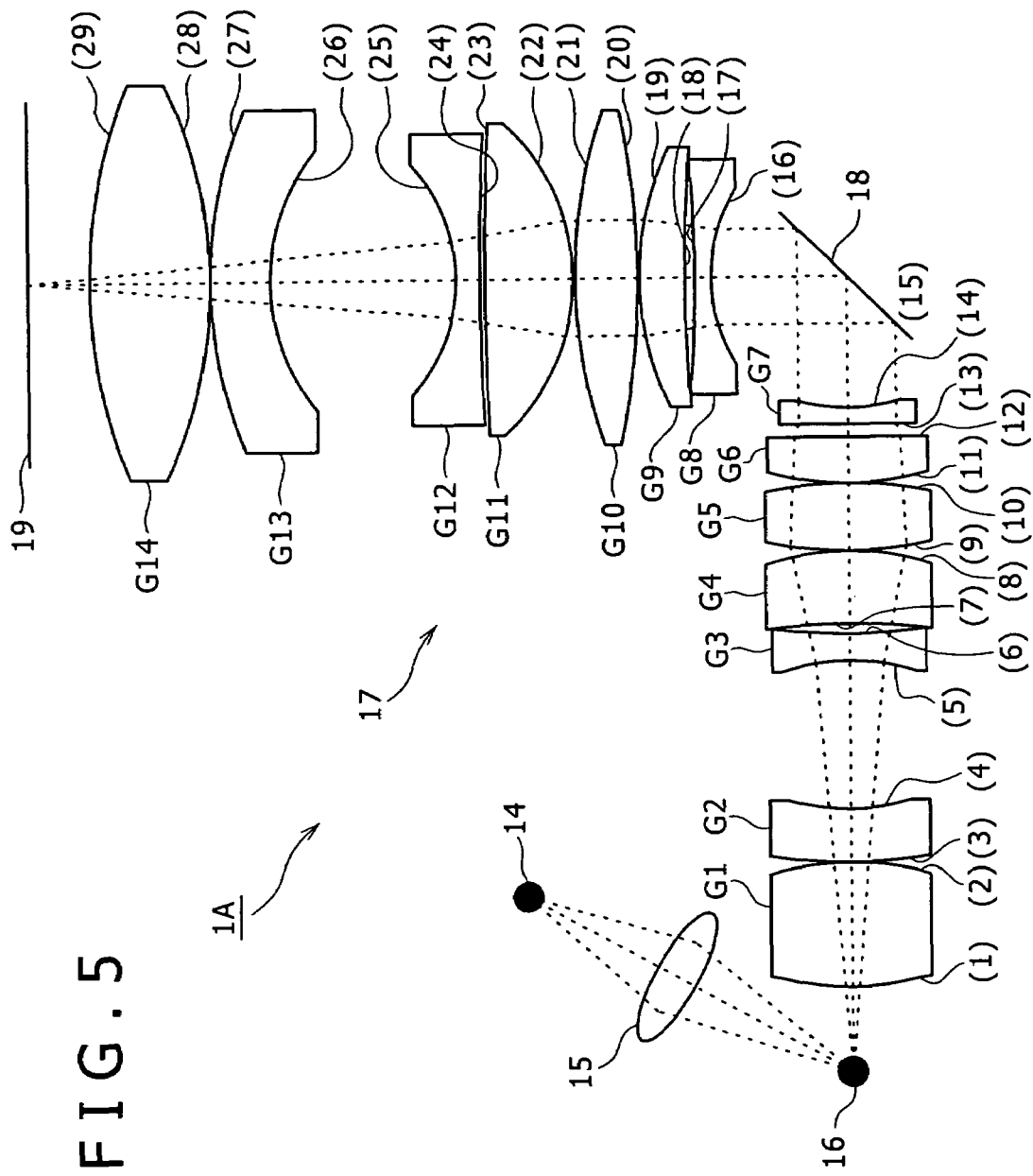
FIG. 5 illustrates Example 1 of the present invention.

FIG. 5 shows an example 1A of carrying out the present invention, showing that Y-axis extending in parallel to the major axis direction of a one-dimensional light modulation device (the array direction of component devices) is set perpendicular to the paper surface of FIG. 5, and the configuration along a section containing X-axis and Z-axis orthogonal to the Y-axis is shown.

The light scanning apparatus 1A includes a light source 14, a condensing optical system 15, the one-dimensional light modulation device 16, and an optical system 17.

The light emitted from the light source 14 using a laser or the like is transmitted through the condensing optical system 15 (shown in a simplified form as a single lens in the figure) to be an illumination beam, with which the one-dimensional light modulation device 16 is irradiated.

The one-dimensional light modulation device 16 operates by receiving a signal (a drive signal based on a picture signal) from a drive circuit (not shown), and the beam reflected thereon is incident on the optical system 17 under telecentric conditions. Incidentally, in the case of using a GLV device as the one-dimensional light modulation device 16, movable ribbons and fixed ribbons formed thereon with reflective films are alternately arranged on a substrate, and an electrode layer is formed on the back side of the substrate. In the condition where no potential difference is present between the movable ribbon and the electrode layer, the reflective surfaces of the movable ribbon and the fixed ribbon are equal in height, and no diffracting action occurs, so that the incident beam wavefront outgoes directly as a positive reflected beam (0 order beam). When a potential difference is provided between the movable ribbon and the electrode layer to bring the movable ribbon closer to the substrate side, a reflecting and diffracting action occurs, ±1 order reflected and diffracted beam waves are generated in response to the incident beam wave. With the displacement amounts (depths) of the individual movable ribbons controlled according to the picture signal, a phase reflection type diffraction grating is obtained.

The optical system 17 is an equal-size imaging optical system, and includes the former group G1 to G7, a movable reflecting mirror (rotating mirror) 18 as a component device of the beam deflection means, and the latter group G8 to G14.

The former group G1 to G7 and the latter group G8 to G14 are disposed symmetrically with each other on the opposite sides of the movable reflecting mirror 18, and are configured to have the same lens parameters as will be described later; however, the former group located on the incidence side (the one-dimensional light modulation device side) and the latter group located on the outgoing side (the two-dimensional image side) are different in optical effective range, so that they may be different in outside diameter.

The beam modulated by use of the one-dimensional light modulation device 16 is transmitted sequentially through the lenses G1 to G7, to reach the movable reflecting mirror 18. The rotational axis of the movable reflecting mirror 18 is set parallel to the Y-axis, and is turned in a predetermined angular range in the X-Z plane by a drive source (not shown). The beam having been deflected is transmitted sequentially through the lenses of the latter group G8 to G14, to form an image thereafter. In other words, a two-dimensional image 19 is obtained according to the scanning by the beam deflection means (only the sectional lines of the image are shown in the figure).

Incidentally, in the case where each component device of the one-dimensional light modulation device 16 simply performs light intensity modulation, it suffices to use the movable reflecting mirror 18. However, in the case of utilizing a diffracting action such as in the case of a GLV device, it is necessary to add a schlieren diaphragm to the movable reflecting mirror or to dispose a schlieren diaphragm in the vicinity of the movable reflecting mirror, thereby providing the function of a schlieren filter for separating a specified diffracted light component.

The data of the optical system 17 shown in this example are shown in Table 1 below. Incidentally, the F number in the major axis direction of the one-dimensional light modulation device is 10, that in the scanning direction is 5, and the incidence angle range of incidence on the movable reflecting mirror 18 for light scanning is ±9.5° (19° in total) with 45° as a center. When the length in the major axis direction of the one-dimensional light modulation device 16 is assumed to be "14" in arbitrary unit, the two-dimensional image 19 is in the shape of a rectangle sizing "32.9×14" (arbitrary unit) (the length 32.9 of the major side is the length in the scanning direction, and equal-size projection (magnification factor is 1) is conducted in the Y-axis direction).

"ADE", "BDE" and "CDE" represent the rotating angles (unit: °) about the X-axis, Y-axis and Z-axis, respectively. In the example shown in Table 1, the reflecting surface (see surface No. 15 in Table 1) is set at an angle of 45° against the optical axis on the incidence side, and light scanning is conducted in a predetermined angular range (±9.5°) with the beam reflected at an angle of 90° (reflection angle: 45°) by the reflecting surface as the center of scanning.

As seen from Table 1 above, the surfaces the sum of surface numbers of which is 30 have the equal parameter value (for example, lenses G2 and G13), with the reflecting surface of surface No. 15 as a reference, and a lens configuration with symmetry with respect to the reflecting surface of the movable reflecting mirror 18 is thus adopted. Incidentally, each lens surface is a spherical surface.

TABLE 1

| Surface No., etc. | Radius of curvature | Surface interval | Action of surface | Material | Remarks |
|---|---|---|---|---|---|
| OBJ | ∞ | 20.048660 | | | |
| 1 | 97.50000 | 24.940000 | | FCD1_HOYA | |
| 2 | −97.50000 | 0.300000 | | | |
| 3 | 94.60000 | 11.790000 | | FCD1_HOYA | |
| 4 | 44.29400 | 39.560000 | | | |
| 5 | −34.74000 | 5.000000 | | E-FD15_HOYA | |
| 6 | 531.68000 | 1.090000 | | | |
| 7 | 619.00000 | 17.950000 | | FCD1_HOYA | |
| 8 | −43.88000 | 0.450000 | | | |
| 9 | 82.75400 | 13.690000 | | TAFD5_HOYA | |
| 10 | −143.75000 | 0.300000 | | | |
| 11 | 59.91000 | 9.050000 | | TAF1_HOYA | |
| 12 | 440.90000 | 2.740000 | | | |
| 13 | −179.20000 | 3.000000 | | E-F5_HOYA | |
| 14 | 35.80000 | 28.000000 | | | |
| 15 | ∞ | −28.000000 | REFL | | ADE: 0.000000 BDE: 45.000000 CDE: 0.000000 |
| 16 | 35.80000 | −3.000000 | | E-F5_HOYA | |
| 17 | −179.20000 | −2.740000 | | | |
| 18 | 440.90000 | −9.050000 | | TAF1_HOYA | |
| 19 | 59.91000 | −0.300000 | | | |
| 20 | −143.75000 | −13.690000 | | TAFD5_HOYA | |
| 21 | 82.75400 | −0.450000 | | | |
| 22 | −43.88000 | −17.950000 | | FCD1_HOYA | |
| 23 | 619.00000 | −1.090000 | | | |
| 24 | 531.68000 | −5.000000 | | E-FD15_HOYA | |
| 25 | −34.74000 | −39.560000 | | | |
| 26 | 44.29400 | −11.790000 | | FCD1_HOYA | |
| 27 | 94.60000 | −0.300000 | | | |
| 28 | −97.50000 | −24.940000 | | FCD1_HOYA | |
| 29 | 97.50000 | −20.048660 | | | |
| IMG | ∞ | 0.000000 | | | |

As for the coordinate system in the above table and the tables given below, local setting is adopted (for example, the set directions of the coordinate system are changed according to reflection). The surface No., etc. are given for specifying each component plane, "OBJ" means the object point (in this example, the one-dimensional light modulation device 16), and "IMG" means the image plane (two-dimensional image plane).

As to the surface interval, the value thereof between the adjacent optical elements is given in the line directly above the relevant line column, and the sign is reversed at each lens in the latter group due to the reflection on the movable reflecting mirror 18.

As for the action of surface, "REFL" represents the reflecting surface, while the absence of indication (exclusive of OBJ and IMG) represents a transmitting surface.

The interval (39.56) between G2 and G3 or between G12 and G13 is within the range of 30 to 50% of the focal distance "100" (arbitrary unit) of the whole group inclusive of both the lenses, and the opposed surfaces of both the lenses are concave surfaces. In addition, G2 and G13 are meniscus lenses.

A part or parts (for example, G1, G4, G11 and G14) of the lenses constituting the former group and the latter group are formed by use of a low dispersion glass having an Abbe number of not less than 80 (FCD1_HOYA: refractive index Nd=1.49700, Abbe number vd=81.6). In addition, the component lenses G5, G6, G8 and G9 are formed by use of a high refractive index glass having a refractive index of not less than 1.7 (TAFD5_HOYA: Nd=1.83500, TAF1_HOYA: Nd=1.77250).

Now, the aberration diagram for the above-mentioned optical system will be described.

Figure 6:
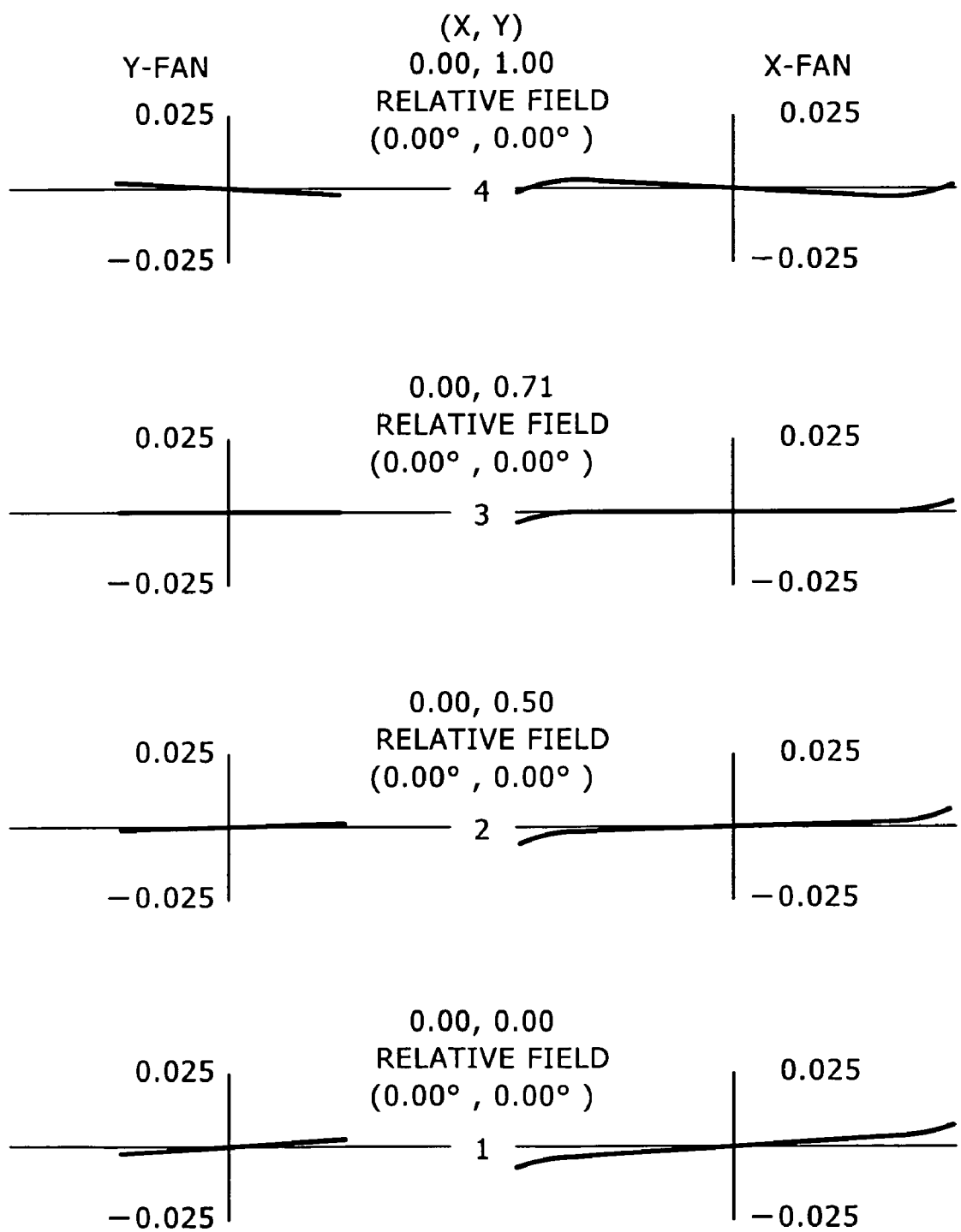
FIG. 6, together with FIGS. 7 to 10, illustrates lateral aberration at a wavelength of 532 nm, and shows the case where the reflecting surface is at 45 degrees against the incident beam.
Figure 7:
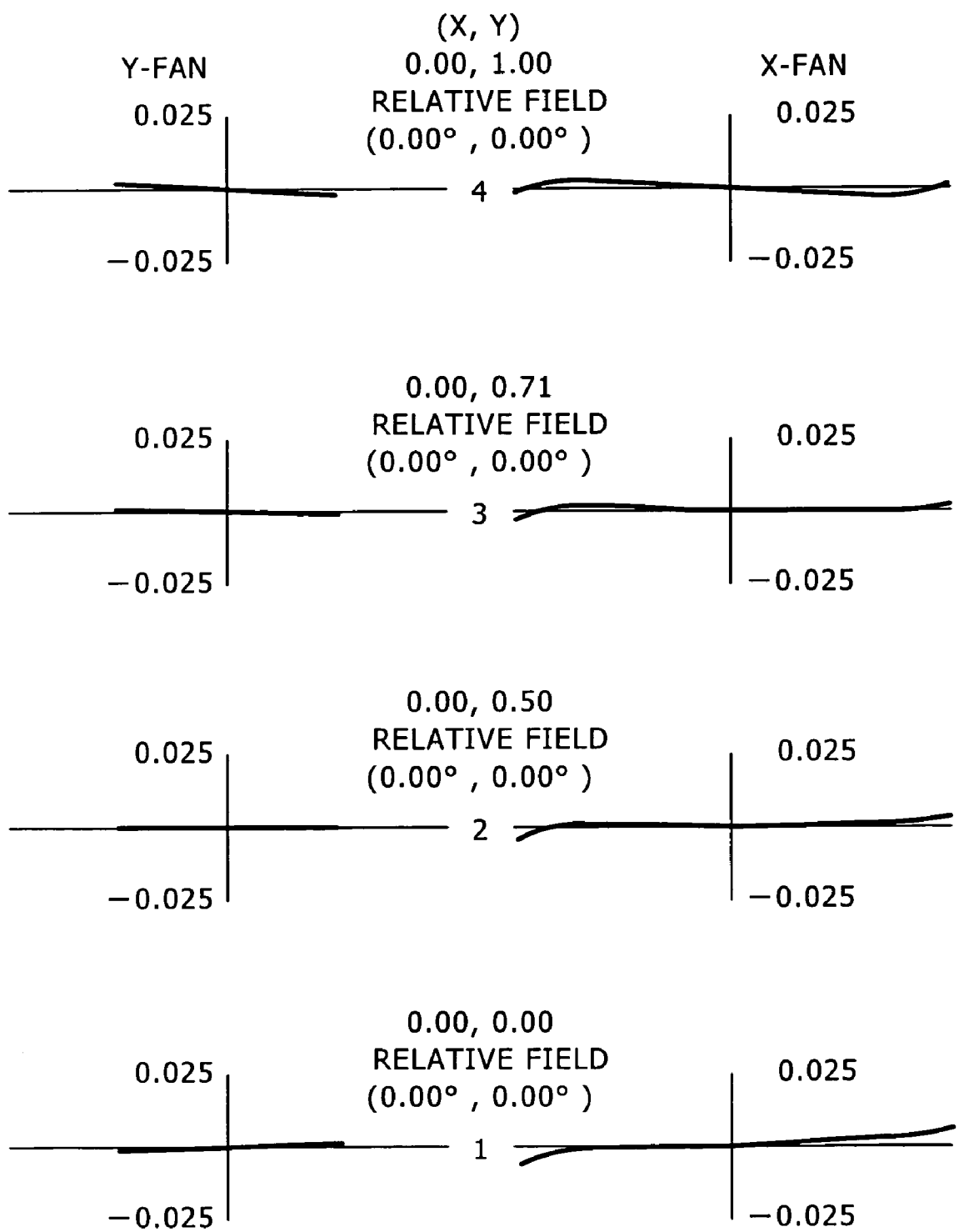
FIG. 7 shows the case where the reflecting surface is at 47.5 degrees against the incident beam.
Figure 8:
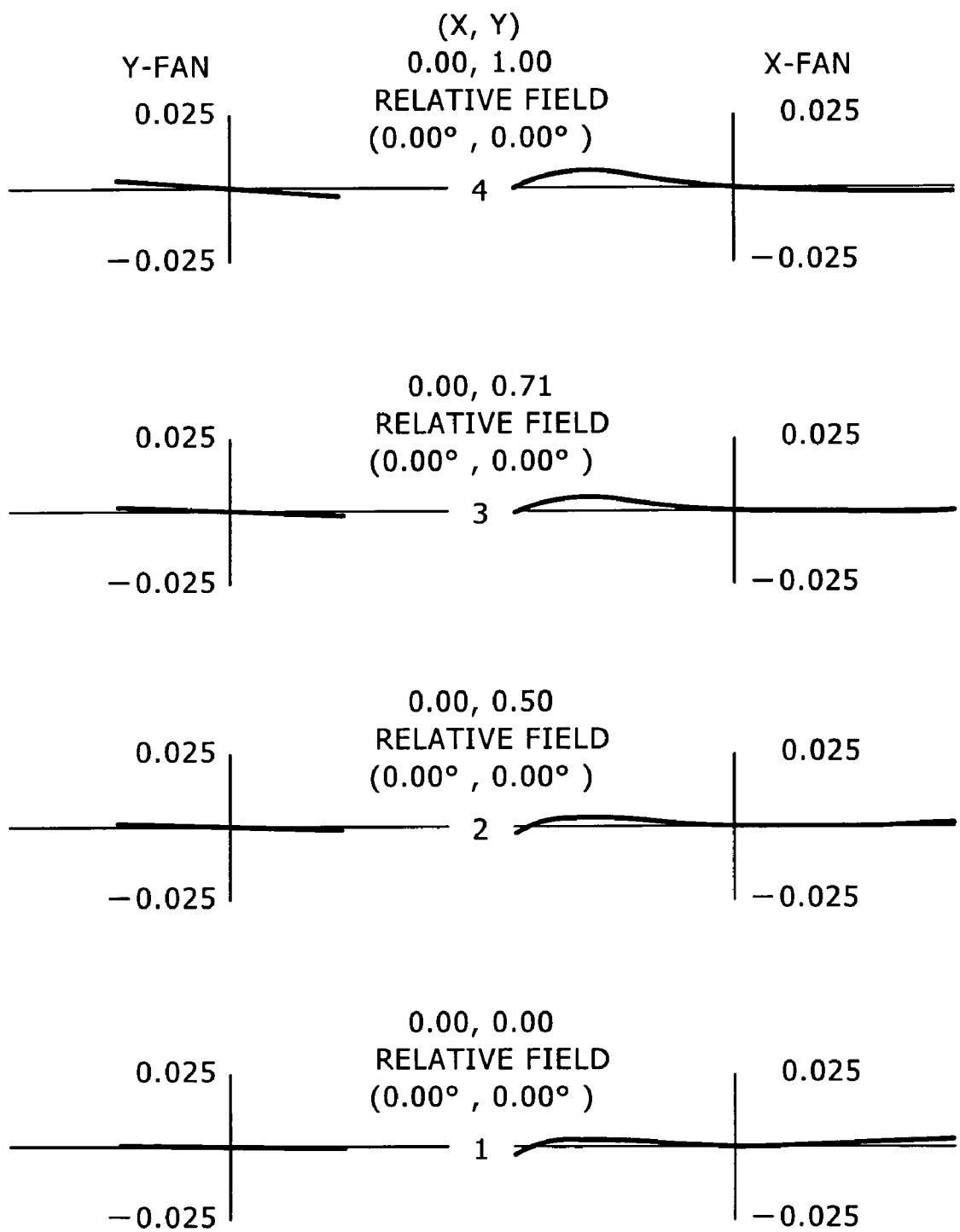
FIG. 8 shows the case where the reflecting surface is at 50 degrees against the incident beam.
Figure 9:
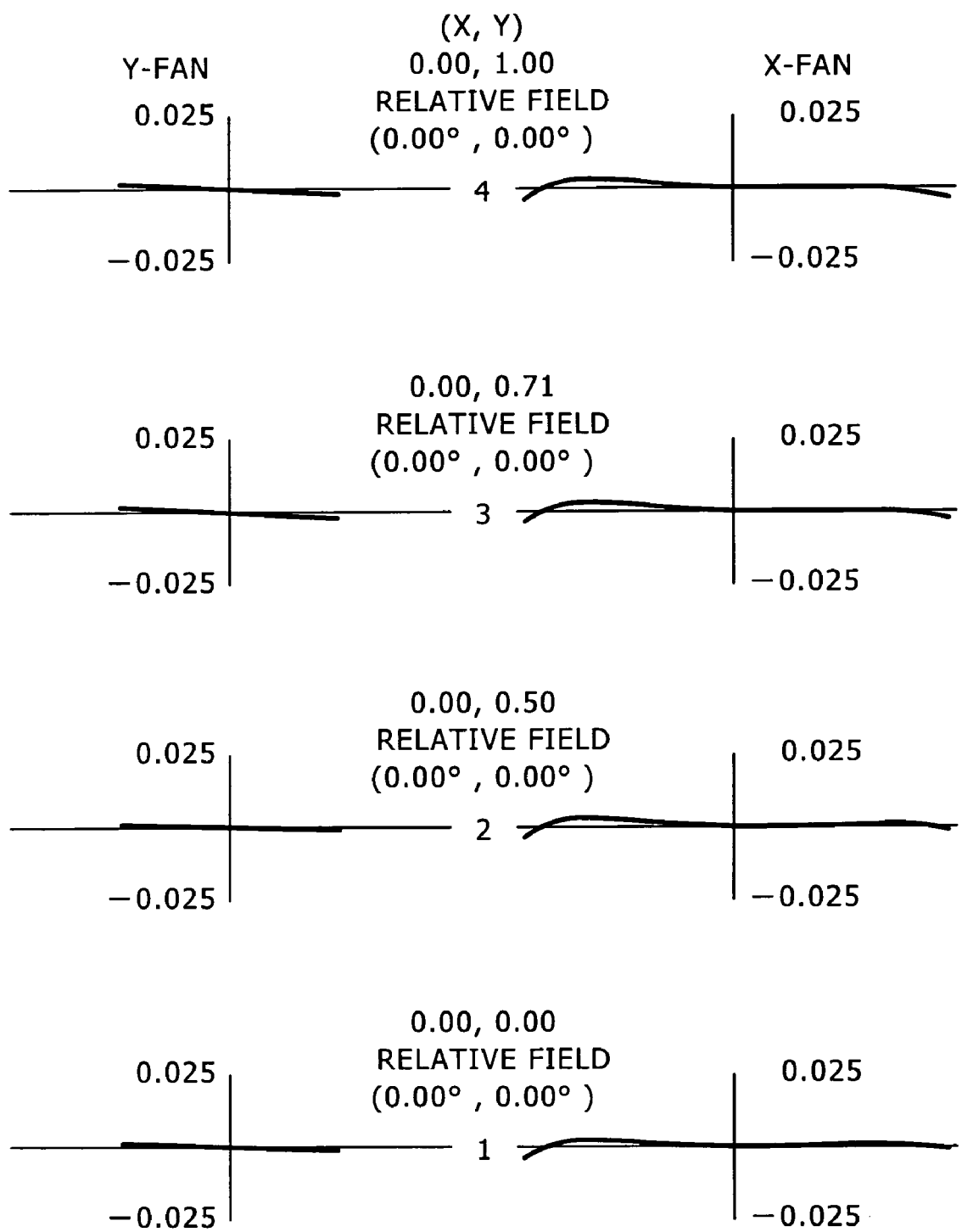
FIG. 9 shows the case where the reflecting surface is at 52.5 degrees against the incident beam.
Figure 10:
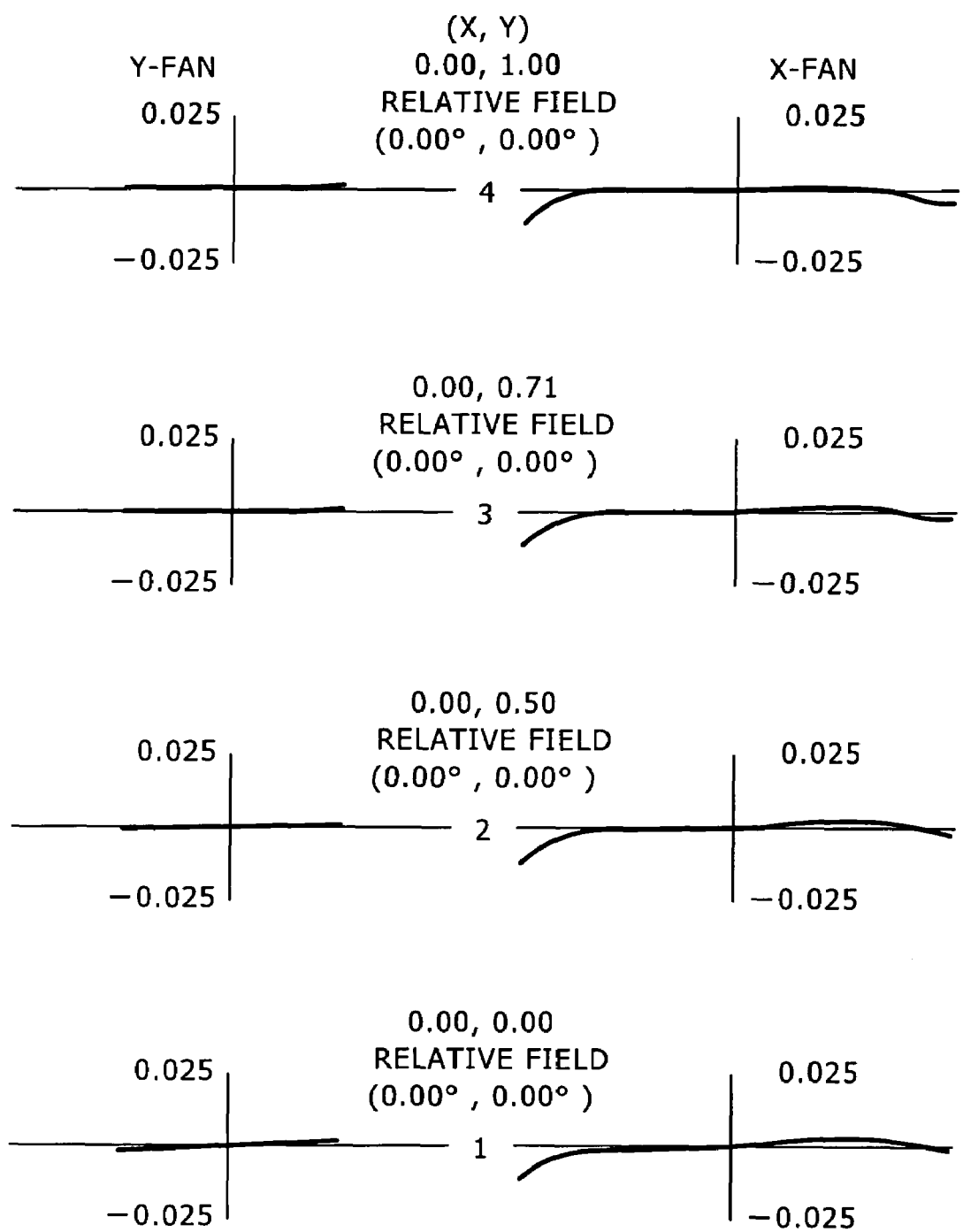
FIG. 10 shows the case where the reflecting surface is at 54.5 degrees against the incident beam.

FIGS. 6 to 10 shows lateral aberration diagrams at a wavelength λ=532 nm. FIG. 6 shows the case where the reflecting surface (surface No. 15) is at an angle of 45 degrees against the incident beam, FIG. 7 shows the case where the angle is (45+2.5) degrees against the incident beam, FIG. 8 shows the case where the angle is (45+5) degrees against the incident beam, FIG. 9 shows the case where the angle is (45+7.5) degrees against the incident beam, and FIG. 10 shows the case where the angle is (45+9.5) degrees. In addition, in each of the figures, the diagrams starting from the lowest one sequentially show the cases where the object height is 0, 7, 10 and 14, respectively, the diagrams on the left side are aberration diagrams in the major axis direction of the one-dimensional light modulation device, while the diagrams on the right side are aberration diagrams in the scanning direction ("Y-FAN" means the YZ plane in the case where the Y direction is the array direction of the one-dimensional devices and the Z direction is the optical axis direction, and the aberration diagrams gives representations relative to the pupil coordinates in the YZ plane. Similarly, "X-FAN" means the XZ plane in the case where the X direction is the scanning direction.).

In this example, the size of one pixel is 0.025, and a high imaging performance is obtained as shown in the figures.

Incidentally, though chromatic aberration is omitted in the figures, on the axis there is no problem inasmuch as the position of the one-dimensional light modulation device is regulated in the FCS (focus) direction at the time of color composing. As for magnification chromatic aberration, it is suppressed roughly to one half of the size of one pixel in the major axis direction of the one-dimensional light modulation device, and is suppressed to 1.5 times the size of one pixel. As for the problem of color misregistration in the scanning direction, it suffices to shift (by electric correction) the modulation timing of the one-dimensional light modulation device for each color, according to the scanning angle.

EXAMPLE 2

Figure 11:
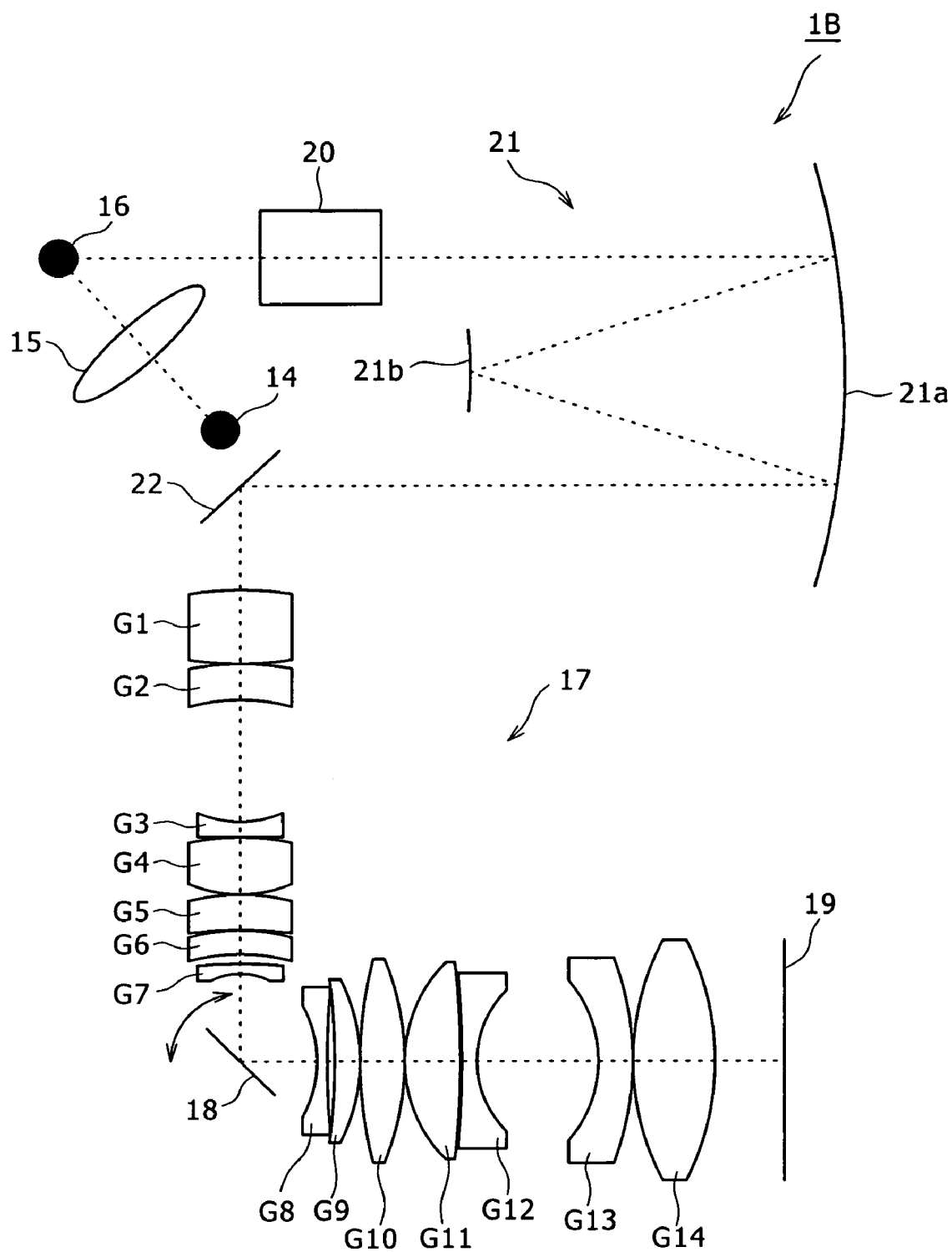
FIG. 11 illustrates Example 2 of the present invention.

FIG. 11 shows an example in which, in the configuration of FIG. 5, an Offner optical system is disposed between the one-dimensional light modulation device and the optical system so as to contrive maintenance of high contrast. Incidentally, like in FIG. 5, the major axis direction of the one-dimensional light modulation device is parallel to the Y axis, and the figure shows the configuration in the X-Z plane.

In a light scanning apparatus 1B, a light source 14 together with a condensing optical system 15 constitutes an illumination system for a one-dimensional light modulation device 16.

The beam reflected by the one-dimensional light modulation device 16 is transmitted through an optical device 20 (a cover glass assuming a color composing prism), to be incident on an Offner optical system 21 of equal-size projection under telecentric conditions.

The Offner optical system 21 is composed of a primary mirror 21a and a secondary mirror 21b, the primary mirror 21a is in charge of the first and third reflections of the luminous flux coming from the one-dimensional light modulation device 16, and the secondary mirror 21b is in charge of the second reflection. Incidentally, since the Offner optical system 21 is an equal-size imaging system, it forms an equal-size real image on the outgoing side of the optical system (In relation to Example 1 shown in FIG. 5, this real image corresponds to the one-dimensional modulation device in FIG. 5, and it is relayed through an optical system 17, to produce a two-dimensional image 19.). In this example, the outgoing beam from the Offner optical system 21 is reflected back by a fixed reflecting mirror 22, to be incident on the optical system 17 under telecentric conditions.

Since the Offner optical system 21 is composed of a reflecting system, chromatic aberration is not generated, and diffraction limit performance can be obtained as imaging performance. Paying attention to this characteristic, a schlieren filter may be set for the secondary mirror 21b in the case of using a diffraction type device represented by a GLV device, whereby an optical system with high contrast can be configured. Incidentally, in the case of treating the 0 order diffracted beam from the GLV device as an ON beam and treating the ±1 order diffracted beams as OFF beams, a configuration may be adopted in which only a specified region separable according to the diffraction angle at the secondary mirror 21b is taken as a reflecting region and the other region is taken as a shielding region on a functional basis. On the contrary, in the case of treating the ±1 order diffracted beams as ON beams and treating the 0 order diffracted beam as an OFF beam, it suffices that the relationship between the reflecting region and the shielding region be reversed as compared with the above-mentioned.

In this example, the back focus can be set longer, which is more advantageous for setting a color composing optical system or the like in color display, as compared with Example 1.

Specific data concerning this example are shown in Tables below (concerning a configuration obtained by combining an Offner optical system with the optical system of Example 1).

TABLE 2

| Surface No., etc. | Radius of curvature | Surface interval | Action of surface | Material | Remarks |
|---|---|---|---|---|---|
| OBJ | ∞ | 79.010000 | | | |
| 1 | ∞ | 41.630000 | | BSC7_HOYA | |
| 2 | ∞ | 151.650000 | | | |
| 3 | −250.00000 | −123.453100 | REFL | | ADE: 39.000000 |
| | | | | | BDE: 0.000000 |
| | | | | | CDE: 0.000000 |
| 4 | −125.00000 | 123.453100 | REFL | | |
| 5 | −250.00000 | −199.785600 | REFL | | ADE: −39.000000 |
| | | | | | BDE: 0.000000 |
| | | | | | CDE: 0.000000 |

TABLE 2-continued

| Surface No., etc. | Radius of curvature | Surface interval | Action of surface | Material | Remarks |
|---|---|---|---|---|---|
| 6 | ∞ | 64.60000 | REFL | | ADE: 0.000000<br>BDE: 45.000000<br>CDE: 0.000000 |

TABLE 3

| Surface No., etc. | Radius of curvature | Surface interval | Action of surface | Material | Remarks |
|---|---|---|---|---|---|
| 7 | 97.50000 | 24.940000 | | FCD1_HOYA | |
| 8 | −97.50000 | 0.300000 | | | |
| 9 | 94.60000 | 11.790000 | | FCD1_HOYA | |
| 10 | 44.29400 | 39.560000 | | | |
| 11 | −34.74000 | 5.000000 | | E-FD15_HOYA | |
| 12 | 531.68000 | 1.090000 | | | |
| 13 | 619.00000 | 17.950000 | | FCD1_HOYA | |
| 14 | −43.88000 | 0.450000 | | | |
| 15 | 82.75400 | 13.690000 | | TAFD5_HOYA | |
| 16 | −143.75000 | 0.300000 | | | |
| 17 | 59.91000 | 9.050000 | | TAF1_HOYA | |
| 18 | 440.90000 | 2.740000 | | | |
| 19 | −179.20000 | 3.000000 | | E-F5_HOYA | |
| 20 | 35.80000 | 28.000000 | | | |
| 21 | ∞ | −28.000000 | REFL | | ADE: 0.000000<br>BDE: 45.000000<br>CDE: 0.000000 |
| 22 | 35.80000 | −3.000000 | | E-F5_HOYA | |
| 23 | −179.20000 | −2.740000 | | | |
| 24 | 440.90000 | −9.050000 | | TAF1_HOYA | |
| 25 | 59.91000 | −0.300000 | | | |
| 26 | −143.75000 | −13.690000 | | TAFD5_HOYA | |
| 27 | 82.75400 | −0.450000 | | | |
| 28 | −43.88000 | −17.950000 | | FCD1_HOYA | |
| 29 | 619.00000 | −1.090000 | | | |
| 30 | 531.68000 | −5.000000 | | E-FD15_HOYA | |
| 31 | −34.74000 | −39.560000 | | | |
| 32 | 44.29400 | −11.790000 | | FCD1_HOYA | |
| 33 | 94.60000 | −0.300000 | | | |
| 34 | −97.50000 | −24.940000 | | FCD1_HOYA | |
| 35 | 97.50000 | −19.000000 | | | |
| IMG | ∞ | 0.000000 | | | |

Incidentally, surface Nos. 3 and 5 show the reflecting surface of the primary mirror 21a, and surface No. 4 shows the reflecting surface of the secondary mirror 21b. Besides, the meanings of the symbols in the tables are the same as above.

EXAMPLE 3

Figure 12:
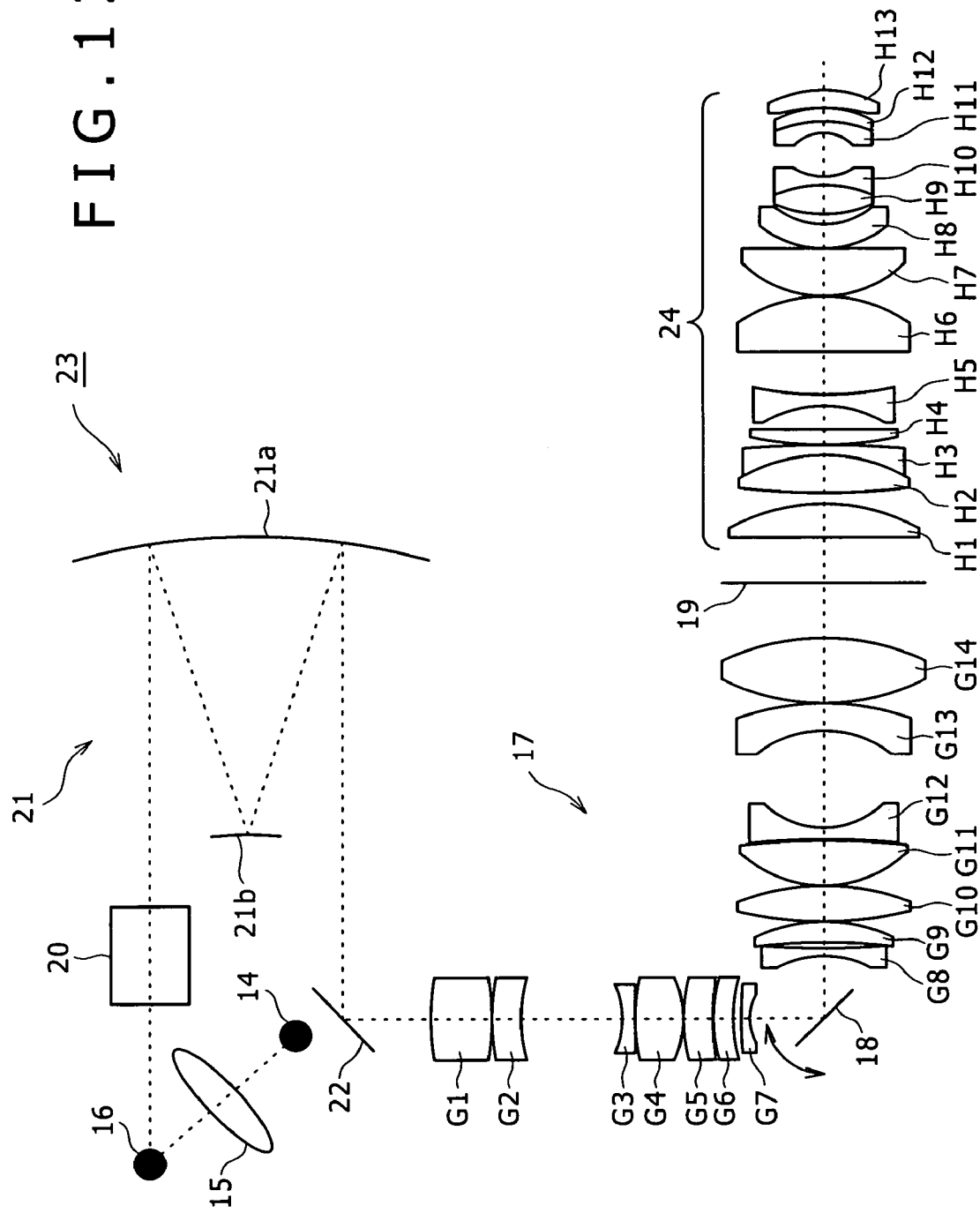
FIG. 12 illustrates Example 3 of the present invention.

FIG. 12 shows an exemplary configuration of an imaging apparatus according to an embodiment of the present invention, and shows an example of application to a projector apparatus.

In an imaging apparatus 23, a projecting optical system 24 is added to the configuration of Example 2 above. Specifically, a two-dimensional image 19 formed by an optical system 17 is used as an intermediate image, and the intermediate image is further enlargedly projected onto a screen on a functional basis (In relation to the projecting optical system 24, the two-dimensional image 19 and a screen image (not shown) are in the object-image relationship.).

The projecting optical system 24 shown in this example is composed of 13 lenses (H1 to H13) (description of data is omitted).

Incidentally, in a one-dimensional light modulation device utilizing a diffracting action, it is necessary to select a diffracted light component of a specified order, and the following various forms of schlieren filter may be mentioned.

(I) A configuration form in which a secondary mirror in an Offner optical system is provided with the function of a schlieren filter (II) A configuration form in which a schlieren diaphragm is added to a movable reflecting mirror constituting a beam deflection means or a schlieren diaphragm is disposed in the vicinity of the movable reflecting mirror In (I) above, the characteristic approaching the diffraction limit performance of the Offner optical system is utilized, whereby good separation characteristic can be obtained, and high contrast can be achieved.

In (II) above, the Offner optical system is not an essential configurational requirement, and an inexpensive and highly reliable system can be built up.

The configurations described above, in application to an apparatus in which the light from an illumination optical system is modulated by use of a one-dimensional light modulation device and a one-dimensional image obtained upon the modulation is scanned to form a two-dimensional image, are effective for the purposes of enhancing image quality, reducing size, reducing cost, and the like.

It should be understood by those skilled in the art that various modifications, combinations, sub-combinations and alterations may occur depending on design requirements and other factors insofar as they are within the scope of the appended claims or the equivalents thereof.

What is claimed is:

1. A light scanning apparatus comprising a one-dimensional light modulation device having a plurality of component devices arrayed in a predetermined direction, a beam deflection means for scanning a one-dimensional image obtained through light modulation by use of said one-dimensional light modulation device, in a direction orthogonal to the array direction of said component devices of said one-dimensional light modulation device, and an optical system including said beam deflection means therein, wherein
said one-dimensional light modulation device is disposed on the object side of said optical system, said beam deflection means is disposed at a diaphragm position, and a two-dimensional image is formed on an image plane of said optical system by scanning said one-dimensional image by use of said beam deflection means.

2. The scanning apparatus as set forth in claim 1, wherein
said optical system is comprised of a positive-power former group and a positive-power latter group which are located on opposite sides of said beam deflection means, said former group being located on the one-dimensional light modulation device side of said beam deflection means, and said latter group being located on the two-dimensional image side of said beam deflection means.

3. The light scanning apparatus as set forth in claim 1, wherein
said optical system is comprised of a former group and a latter group which are located on opposite sides of said beam deflection means, said former group being located on the one-dimensional light modulation device side of said beam deflection means, and said latter group being located on the two-dimensional image side of said beam deflection means, and said optical system is telecentric on the one-dimensional light modulation device side and on the two-dimensional image side.

4. The light scanning apparatus as set forth in claim 1, wherein
of said optical system, optical devices exclusive of the component devices of said beam deflection means have rotation-symmetric surfaces about an optical axis.

5. The light scanning apparatus as set forth in claim 1, wherein
said optical system includes a lens having a concave surface opposed to said beam deflection means.

6. The light scanning apparatus as set forth in claim 2, wherein
said former group and said latter group have structurally symmetric with each other with respect to said beam deflection means, and constitute an equal-size imaging system.

7. The light scanning apparatus as set forth in claim 6, wherein
said former group and said latter group are each comprised of seven lenses, and, when the lenses arrayed in the direction from the side of said one-dimensional light modulation device or said two-dimensional image toward said beam deflection means are called the first to seventh lenses, then said first lens has positive power, said second lens has negative power, said third lens has negative power, said fourth lens has positive power, said fifth lens has positive power, said sixth lens has positive power, and said seventh lens has negative power.

8. The light scanning apparatus as set forth in claim 7, wherein
the interval between said second lens and said third lens is in the range of 30 to 50% based on the focal distance of the whole group inclusive of both said lenses, and the opposed surfaces of both said lenses are concave surfaces.

9. The light scanning apparatus as set forth in claim 7, wherein
said second lens has a meniscus shape.

10. The light scanning apparatus as set forth in claim 7, wherein
a part of said lenses constituting said former group or said latter group is formed by use of a low dispersion material having an Abbe number of not less than 80.

11. The light scanning apparatus as set forth in claim 7, wherein
a part of said lenses constituting said former group or said latter group is formed by use of a high refractive index material having a refractive index of not less than 1.7.

12. The light scanning apparatus as set forth in claim 1, wherein
an Offner optical system is disposed as a relay imaging system between said one-dimensional light modulation device and said optical system.

13. The light scanning apparatus as set forth in claim 1, wherein
a projection optical system is disposed for enlargingly projecting said two-dimensional image.

14. The light scanning apparatus as set forth in claim 12, wherein
a projection optical system is disposed for enlargingly projecting said two-dimensional image.

15. An imaging apparatus comprising a one-dimensional light modulation device having a light source and a plurality of component devices arrayed in a predetermined direction for modulating the light from said light source, and an optical system including therein a beam deflection means for scanning a one-dimensional image obtained through light modulation by use of said one-dimensional light modulation device, a two-dimensional image being formed by scanning said one-dimensional image, wherein
said one-dimensional light modulation device is disposed on the object side of said optical system, said beam deflection means is disposed at a diaphragm position, and said two-dimensional image is formed on an image plane of said optical system by scanning said one-dimensional image by use of said beam deflection means.

16. The imaging apparatus as set forth in claim 15, wherein
said optical system is comprised of a positive-power former group and a positive-power latter group which are located on opposite sides of said beam deflection means, said former group being located on the one-dimensional light modulation device side of said beam deflection means, and said latter group being located on the two-dimensional image side of said beam deflection means.

17. The imaging apparatus as set forth in claim 15, wherein
said optical system is comprised of a former group and a latter group which are located on opposite sides of said beam deflection means, said former group being located on the one-dimensional light modulation device side of said beam deflection means, and said latter group being located on the two-dimensional image side of said beam deflection means, and said optical system is telecentric on the one-dimensional light modulation device side and on the two-dimensional image side.

18. The imaging apparatus as set forth in claim 15, wherein
of said optical system, optical devices exclusive of the component devices of said beam deflection means have rotation-symmetric surfaces about an optical axis.

19. The imaging apparatus as set forth in claim 15, wherein
said optical system includes a lens having a concave surface opposed to said beam deflection means.

20. The imaging apparatus as set forth in claim 16, wherein
said former group and said latter group have structurally symmetric with each other with respect to said beam deflection means, and constitute an equal-size imaging system.

21. The imaging apparatus as set forth in claim 20, wherein
said former group and said latter group are each comprised of seven lenses, and, when the lenses arrayed in the direction from the side of said one-dimensional light modulation device or said two-dimensional image toward said beam deflection means are called the first to seventh lenses, then said first lens has positive power, said second lens has negative power, said third lens has negative power, said fourth lens has positive power, said fifth lens has positive power, said sixth lens has positive power, and said seventh lens has negative power.

22. The imaging apparatus as set forth in claim 21, wherein
the interval between said second lens and said third lens is in the range of 30 to 50% based on the focal distance of the whole group inclusive of both said lenses, and the opposed surfaces of both said lenses are concave surfaces.

23. The imaging apparatus as set forth in claim 21, wherein
said second lens has a meniscus shape.

24. The imaging apparatus as set forth in claim 21, wherein
a part of said lenses constituting said former group or said latter group is formed by use of a low dispersion material having an Abbe number of not less than 80.

25. The imaging apparatus as set forth in claim 21, wherein
a part of said lenses constituting said former group or said latter group is formed by use of a high refractive index material having a refractive index of not less than 1.7.

26. The imaging apparatus as set forth in claim 15, wherein
an Offner optical system is disposed as a relay imaging system between said one-dimensional light modulation device and said optical system.

27. The imaging apparatus as set forth in claim 15, wherein
a projection optical system is disposed for enlargingly projecting said two-dimensional image.

28. The imaging apparatus as set forth in claim 26, wherein
a projection optical system is disposed for enlargingly projecting said two-dimensional image.

29. The imaging apparatus as set forth in claim 15, wherein a schlieren diaphragm is added to or arranged for a reflecting mirror constituting said beam deflection means.

* * * * *